United States Patent [19]

Helferich et al.

[11] Patent Number: 4,871,495

[45] Date of Patent: * Oct. 3, 1989

[54] PROCESS FOR PRODUCING POROUS CERAMIC FILTER FOR FILTERING OF PARTICULATES FROM DIESEL EXHAUST GASES

[75] Inventors: Richard L. Helferich, Clayton; Robert C. Schenck, Kettering, both of Ohio

[73] Assignee: The Duriron Company, Inc., Dayton, Ohio

[ * ] Notice: The portion of the term of this patent subsequent to Mar. 14, 2006 has been disclaimed.

[21] Appl. No.: 127,784

[22] Filed: Dec. 2, 1987

[51] Int. Cl.$^4$ .................. B28B 1/50; B29C 71/00; C04B 38/10

[52] U.S. Cl. .................. 264/43; 264/44; 264/45.1; 264/51; 264/233; 264/344; 501/84

[58] Field of Search .................. 264/43, 59, 48, 42, 264/51, 52, 54, 45.1–45.5, 233, 344; 501/84; 55/523

[56] References Cited

U.S. PATENT DOCUMENTS

| | | | |
|---|---|---|---|
| 1,638,849 | 8/1927 | Haverstick | 106/84 |
| 1,638,888 | 8/1927 | Slepian | 106/84 |
| 1,682,675 | 8/1928 | Horsfield | 264/43 X |
| 1,761,108 | 6/1930 | Desmarquest | 264/43 |
| 1,842,186 | 1/1932 | McBerty | 264/43 |
| 1,880,157 | 9/1932 | Setterberg | 264/43 |
| 2,216,251 | 10/1940 | Quisling | 106/75 |
| 2,322,667 | 6/1943 | Seastone et al. | 106/84 |
| 3,419,495 | 12/1968 | Weldes et al. | 106/84 |
| 3,537,816 | 11/1970 | Moscou | 423/112 |
| 3,700,470 | 10/1972 | Barton | 106/75 |
| 3,762,935 | 10/1973 | Leach | 264/43 X |
| 3,855,393 | 12/1974 | Rao | 106/75 X |
| 4,059,658 | 11/1977 | Shoup et al. | 264/43 |
| 4,071,369 | 1/1978 | Kurz et al. | 264/43 X |
| 4,133,691 | 1/1979 | Kindt et al. | 106/75 |
| 4,217,240 | 8/1980 | Bergna | 502/263 |
| 4,356,271 | 10/1982 | Francis et al. | 264/43 X |
| 4,357,165 | 11/1982 | Helferich et al. | 106/84 X |
| 4,432,798 | 2/1984 | Helferich et al. | 106/84 X |
| 4,574,063 | 3/1986 | Scherer | 264/60 |
| 4,721,696 | 1/1988 | Kidd | 502/263 X |
| 4,812,424 | 3/1989 | Helferich et al. | 264/48 X |
| 4,814,300 | 3/1989 | Helferich | 264/48 X |

Primary Examiner—Jan H. Silbaugh
Assistant Examiner—Karen D. Kutach
Attorney, Agent, or Firm—St.Onge Steward Johnston & Reens

[57] ABSTRACT

A process for producing a porous ceramic filter for use in the filtering of particulates from diesel exhaust gases, and the filter so produced, in which a foamable ceramic composition based upon an aluminosilicate hydrogel binder is expanded into a self-supporting, open-celled porous body of desired shape by virtue of in situ reaction between components of the composition, and thereafter treated to substantially reduce its alkali metal content and fired to produce ceramic bonds, the process further preferably providing on the intended outlet surface of the filter a thin porous ceramic membrane layer whose pores have an average diameter less than that of the pores within and at other surfaces of the ceramic filter.

5 Claims, No Drawings

PROCESS FOR PRODUCING POROUS CERAMIC FILTER FOR FILTERING OF PARTICULATES FROM DIESEL EXHAUST GASES

BACKGROUND OF THE INVENTION

The present invention relates to porous ceramic articles, and more particularly to porous ceramic articles for use as filters for removing particulates from diesel exhaust gases.

"Diesel exhaust traps" are filtering devices designed to remove particulate material (e.g., soot) from the exhaust of automobile or truck diesel engines, a need dictated to a large extent by increasingly stringent governmental regulations in the United States and European countries regarding maximum allowable particulates in automotive emission gases. Generally, soot trapped by the filtering devices is then periodically combusted in the filter so as to regenerate the filtering surfaces, the combustion being initiated, for example, by electrical means or fuel burner devices associated with the overall trap design, or by variable operation of the engine itself or other means to provide to the filter an exhaust stream sufficiently hot to initiate the combustion process.

As a consequence of the generalized designs for particulate traps of this type, the filtering element is required to have a number of properties. Obviously, it is essential that the filtering element exhibit porosity which permits trapping of particulates, but at the same time it is essential that the construction of the filter be such that exhaust gases can travel relatively easily therethrough without creation of any significant degree of back pressure. Moreover, it is necessary that the filtering element present a substantial filtering surface per unit length, area or volume so as to permit the element to be fabricated in an overall size consistent with the constraints imposed by the size of the exhaust systems of diesel-powered automobiles and trucks. Because of its exposure to hot exhaust gases, and even higher temperatures during a combustion/regeneration cycle, the filtering element also necessarily must possess structural and dimensional stability under such conditions.

The prior art has sought to provide filtering elements for diesel particulate traps possessing these physical characteristics by resort to a variety of materials. Early efforts relied upon stainless steel mesh or coils of fibrous metallic wire as filtering materials, as evidenced by U.S. Pat. Nos. 3,937,015 and 4,270,936, respectively. More recent efforts have concentrated upon ceramic materials since they generally possess excellent structural and dimensional stability under stringent (i.e., high temperature) operating conditions, with the requirement that the trap exhibit porosity effective to filter soot from exhaust gases being accomplished by various compositional and processing techniques. Most notable in these efforts has been the utilization of so-called ceramic monolithic honeycomb filtering elements as described, for example, in U.S. Pat. Nos. 4,276,071 and 4,364,761 assigned to General Motors Corp.; U.S. Pat. Nos. 4,329,162; 4,415,344; 4,416,675; 4,416,676; 4,417,908; 4,419,108 and 4,420,316 assigned to Corning Glass; and U.S. Pat. Nos. 4,283,210; 4,293,357; 4,307,198; 4,340,403; and 4,364,760 assigned to NGK Insulators. Essentially, these elements consist of a monolithic ceramic having a multitude of internal parallel chambers separated by thin porous ceramic internal walls, with a number of the chambers being end-sealed so as to force particulate-containing exhaust gas to traverse across a porous wall before exiting the element. Generally, these elements are formed by an extrusion process, and materials are included in the compositions which are burned out during the firing process so as to provide the requisite porosity in the internal filtering surfaces. In another process, as reflected in U.S. Pat. No. 4,363,644 assigned to Nippon Soken, foamed, structural polyurethane systems are utilized in admixture with inorganic materials in processes wherein the polyurethane burns out during firing so as to leave behind a ceramic structure having a variety of interconnected open cells for trapping particulates.

While the structural and dimensional properties of ceramics generally lend themselves well to utilization as the material from which filter elements for diesel traps are constructed, it is not an easy or inexpensive matter to achieve from ceramic materials elements possessing the porosity needed to effectively and efficiently filter soot as well as permit exhaust gas flow without substantial build-up of back pressure. For example, in the highly permeable reticulated foam filters in the art, a condition can occur ("blow-off") in which soot already collected in the filter can be dislodged as a consequence either of excessive build-up or sudden increase in the velocity of the exhaust gas stream. Of additional importance, efforts toward optimizing the geometry of diesel filter trap designs (so as to facilitate inclusion of the filter in the exhaust area of a vehicle, or to maximize filtration, or to facilitate regeneration or removal of the filter element) can be severely limited by the inability to produce such shapes efficiently (or at all) utilizing ceramics.

In response to the foregoing limitations in current technology, the present invention provides compositions and methods for making porous refractory ceramic filters for use in removing particulates from diesel exhaust gases. As will be seen, the invention employs moldable/extrudable compositions which enable any variety of shapes to be provided, methods for rendering those shapes more refractory and resistant to thermal shock upon firing, and methods for providing thin porous ceramic membrane layers on the fired article to enhance filtering ability.

SUMMARY OF THE INVENTION

According to the present invention, there is provided a ceramic composition which is capable of being molded (e.g., by casting, injection-molding or by extrusion) into a desired configuration, and which develops predominantly open-celled porosity as a result of internal reactions between and among deliberately preset elements of the composition. Among the significant advantages of the composition is the ability to manipulate its elements and/or the amounts thereof so as to controllably achieve a wide variety of characteristics in the final ceramic article. The moldable composition is self-setting, again controllably, and in the set state is then further processed to remove therefrom substantially all alkali metal in order to enhance and improve the refractoriness and thermal shock properties of the fired porous ceramic filter. During processing, steps also preferably are taken to provide, on, e.g., the outlet surface of the fired porous ceramic filter, a thin porous ceramic membrane.

The composition is comprised of an admixture of an aluminosilicate hydrogel and suitable refractory ceramic materials, e.g., refractory oxides, carbides, nitrides, borides, silicides and the like, such as alumina, chromia, zirconia, magnesia, titania, silica and mixtures thereof (either as admixtures per se or admixed as part of a compound itself, e.g., mullite, cordierite, calcined kyanite and the like), silicon carbide, silicon nitride, boron carbide, boron nitride, and the like. Also included as part of the composition are a particulate metal, a surfactant system and a gel strengthening agent, these latter ingredients being present in essential yet relatively minor proportions relative to the hydrogel and ceramic components. In addition, refractory fibers may be included in the composition to attain yet additional strength in the eventual molded and fired ceramic.

The foregoing composition is described with reference to generally identifiable constituents of the composition at the time of its molding or extrusion and setting, but the general process of preparing the composition utilizes more fundamental components which, upon admixture, result in the formation of the described hydrogel (i.e., rather than addition of the hydrogel as an identifiable separate ingredient). The hydrogel is formed from a water soluble source of silicate and a water soluble source of aluminate, and the remaining components of the composition (e.g., refractory ceramic materials, surfactant, gel strengthening agent, particulate metal, refractory fibers) can be added to or distributed between one or both of the aluminate or silicate compositions. Upon admixture of these two separately prepared and maintained aqueous compositions or slurries, there is formed an aluminosilicate hydrogel which serves to bind together all components of the composition. The hydrogel binder is self-setting at ambient conditions and is capable of setting and binding the composition to a generally self-supporting structure within a brief but controllable time.

According to the present invention, the component parts of the ceramic composition are admixed to form a moldable composition, generally adding the silicate slurry to the aluminate slurry. Mixing is done in this fashion because the aluminate slurry acts to retard the gelation time while the silicate slurry acts as an accelerator. Therefore, if the aluminate slurry is added to the silicate slurry, the possibility exists for a rapid, but partial gelation to occur which would, in effect, result in an incompletely set mix. Before any substantial self-setting of the composition occurs, it is molded to the desired shape, taking into account the fact that the composition will foam and expand to assume the final desired molded shape. During the self-setting reaction, additional reaction takes place within the composition in which the particulate metal reacts with alkali (e.g. sodium) compounds in the composition to produce, inter alia, hydrogen gas. By arranging the self-setting hydrogel reaction to be of suitable duration, the molded composition increases in volume as a consequence of the internal gas generation and takes on a porous nature as the gas evolves within and from the composition. Then, as close as possible to the cessation of gas evolution, the in-situ hydrogel formation causes the composition to set in the desired porous molded configuration.

The supportable porous ceramic shape prepared in this manner is thereafter treated to remove alkali metal therefrom in order to improve refractoriness and thermal shock stability in the fired porous ceramic filter. This is effected through treatment of the porous shape with water to remove leachable alkali metal compounds, followed by treatment with a dilute aqueous solution of an ammonium salt, preferably ammonium chloride, to effect exchange of ammonium ion for remaining alkali metal ions.

At particular points in the overall manufacturing process, steps preferably are taken to provide on, e.g., at least the outlet side of the final fired porous ceramic filter, a thin porous ceramic membrane layer, i.e., a thin layer having open-celled porosity and whose pores have an average size less than that of the pores at other portions of the filter. A number of means are provided to achieve this end, the preferred being those wherein the membrane is formed in situ during the formation of the supportable porous shape.

DETAILED DESCRIPTION OF THE INVENTION

The aluminosilicate hydrogel portion of the composition used in the present invention is, in essential respects, as described in commonly-assigned U.S. Pat. Nos. 4,357,165 and 4,432,798, both of which are expressly incorporated herein by reference. As described in those patents, the hydrogel results from the admixture of water soluble sources of both silicate and aluminate (typically, sodium silicate and sodium aluminate), which admixture then self-sets at ambient temperatures in times which can be exceedingly short (e.g., on the order of as little as a few seconds but typically on the order of a few minutes), but nevertheless can be controlled by predetermined choice of molar ratio between aluminate and silicate, concentration of water, and temperature. The ability to exercise control over setting times for the hydrogel binder leads to important advantages with respect to attainment in the present invention of molded ceramic filters of both desired geometry and desired porosity. Also described in the above-noted patents is the utilization of the hydrogel components along with granular refractory particles to produce, e.g., molds, by virtue of the self-setting hydrogel serving to bind the granular materials into a self-supporting structure.

According to the present invention, the separately prepared and admixed components for forming the aluminosilicate hydrogel have added to them and/or distributed between them the remainder of the components which will make up the moldable ceramic composition and the eventual fired porous ceramic shaped filter article. As earlier noted, the essential elements of this composition, besides the hydrogel-forming constituents, are refractory ceramic materials, particulate metal powder, a gel strengthening agent such as silica fume and a surfactant component, with refractory fibers or other conventional materials optional. The refractory ceramic materials generally will be present in the overall composition in a weight percentage of from about 50% to about 90%, preferably from about 60% to about 70%. In a preferred embodiment of the invention, the ceramic materials included in the composition will be chosen from cordierite, calcined kyanite and mixtures thereof, with most preferred compositions containing nearly equal weight proportions of both cordierite and calcined kyanite, e.g., from about 30 to 35% of each ceramic.

According to the invention, the requisite open-celled porosity in the final ceramic filter article is provided as a consequence of in situ reaction between metal powder and alkali compounds (e.g., sodium hydroxide) present in the moldable composition, resulting in development of hydrogen gas as a reaction by-product. As a consequence of this internal gas production and evolution, the composition will expand in volume in the mold (or during extrusion as the case may be) and develop porosity, the quantity of the composition obviously being regulated to take into account the expected (and predetermined) degree of expansion within the mold or during extrusion to arrive at the desired final density and size of the article. At the same time, the surfactant present in the composition serves to break up the bubbles of evolving gas in the aqueous composition to achieve, controllably, suitably small bubbles and to assure that the porosity developed in the structure will be predominantly of the open-celled type.

The preferred particulate metal is aluminum, although other metals or metal alloys such as silicon or ferrosilicon which similarly will react with alkali compounds present in the composition to produce hydrogen gas also can be employed.

For most generalized compositions, the amount of surfactant and metal (e.g. aluminum) powder will be relatively small compared to the other components of the system, with the typical levels of addition of the surfactant being in the range of from about 0.05 to 1.0 percent by weight of the total composition and the metal being in the range of from about 0.05 to 0.5 percent by weight of the total composition. Preferred ranges of addition for these materials are 0.4 to 0.8 percent by weight for the surfactant (most preferably about 0.6%) and 0.1 to 0.2 percent by weight for the metal powder (most preferably about 0.15%), and a preferred ratio between the surfactant and metal powder is generally from about 2:1 to 8:1, most preferably about 4:1.

Among the preferred class of surfactants (which may be used alone or in combination) for use in the invention are the silicone glycols such as are available from the Dow Chemical Company for use, e.g., in producing polyurethane forms. These surfactants have a stabilizing effect on the gaseous by-products produced and are available in a variety of customized formulations (based upon the silicone glycol chemistry) that are designed to control bubble (or cell) size as well as to dictate that the cells will be predominantly open. For example, the surfactants from Dow Chemical known by the tradenames DC 190, DC 198, Q2 5160 and Q2 5125, provide a mostly open cell structure in the present invention. Although the silicone glycol type surfactants are preferred, a variety of other non-silicone surfactant types also may be employed, such as those available from Air Products & Chemicals, Inc. under tradename LK-221 and LK-443.

With respect to the aluminum or other metal powder, the average particle size of the powder employed generally will be in the range of from about 1 to 44 $\mu$m, and preferably about 6-9 $\mu$m, with the understanding that the larger the surface area of the metal present in the composition, the more vigorous and extensive will be the foaming reaction.

Another essential ingredient of the composition of the invention is a gel strengthening agent, preferably silica fume, although other suitable agents may be employed. Silica fume is a by-product collected in the airstream during the reduction of silica sand by coal or coke in an arc furnace to make metallurgical-grade silicon metal. The particulates are hollow spheres, roughly 0.25 micron in diameter, composed of about 96% silica and having a light carbonaceous layer on their surface. Although the mechanism by which silica fume operates in the compositions of the invention is not entirely understood, its addition brings about a number of advantages, such as lowering the viscosity of the composition for a given solids content and reinforcing the gel network (without increasing viscosity) to give greater green strength. Without the presence of the silica fume, the hydrogel bonded aggregate structure appears more prone to cracking during drying operations. By reinforcing the gel structure, the silica fume reduces shrinkage as the molded article is dried. Generally, it has been found that the silica fume is effective at levels of from about 0.25 to about 10 percent by weight of the total composition, preferably from about 1 to 4 percent by weight, and most preferably from about 1 to 2% by weight.

As noted, gel strengthening agents other than silica fume can be employed, such as fly ash, manganese oxide fume, ferrosilicon fume and the like. Based upon experimentation to date, the chief characteristic required to be possessed by the gel strengthening agent is the small, spherical shape enabling it to react readily with the matrix binder and/or aggregate constituents.

As earlier noted, the moldable ceramic composition may advantageously further comprise refractory ceramic fibers, such as Kaowool ™, Fiberfax ™ and Fiberkal ™ type aluminosilicate fibers, Saffil ™ alumina fibers, silicon carbide whiskers and calcium silicate fibers, to give further rigidity to the molded and fired filter structure. Typically, these fibers can be present in an amount up to as much as about 60 percent by weight of the composition, but most typically are employed in amounts from about 1 to 4% by weight.

In the present invention, the components of the ceramic composition are selected to yield a particular setting time (e.g., by variation in aluminate/silicate ratio and/or solids content, and taking into account the temperature at which the composition will be cast or extruded), consistent with the anticipated duration of the foaming process in the mold or during extrusion. As noted earlier, a distinct advantage of the invention is that the setting time can be arranged to achieve a particular dimensionally stable degree of gelation at or very near the time when the gassing reaction ceases, thus insuring retention of the developed porosity in the molded and eventually fired article. If gelation occurs too soon, the composition lacks the freedom to develop and accommodate the desired degree of porosity and/or may result in cracking of the set structure as gas continues to be evolved, while if gelation is delayed too long, the developed porosity will have a tendency to break down before the structure can be firmed up. While this latter problem might be curable by excess utilization of surfactant and/or aluminum, cure in this way may introduce into the article too substantial amount of components making control more difficult and which may adversely affect final product characteristics.

As noted, the presence of silica fume in the composition results in substantial reduction of the viscosity of the composition, the measured reduction being greater at higher spindle speeds on the measuring device and also greater with increasing amount of silica fume. The green strength (as measured by the modulus of rupture or MOR) of the molded shapes generally increases with increasing silica fume content. Increase in the amount of surfactant or increase in available surface area of metal (aluminum) (increase in amount or also, e.g., by using either a flaked metal or smaller grain size) increases the number of pores per linear inch in the molded product. Increase in slurry temperature or other means to decrease set time results in an increase in density of the molded product, while a decrease in the available surface area of aluminum or other metal powder also increases the density.

Following the removal of the molded porous ceramic shape from the mold or extrusion chamber, it is necessary to treat it to reduce or, ideally eliminate, alkali metal (e.g., sodium) therein prior to the firing process so as to avoid the formation in the fired filter of glassy phases which would reduce the refractoriness or thermal shock stability of the ceramic filter. This may be accomplished by a number of techniques, but the most preferred is to contact the unfired porous shape with water to leach alkali metal compounds therefrom, and then to follow this with contact with a dilute aqueous solution of an ammonium salt, such as ammonium chloride, to effect substantially complete exchange of ammonium ion for any sodium ion remaining.

Following any removal of alkali or other fluxing or glass-forming ingredients, the molded article is dried to remove any water therefrom and is then fired in any suitable furnace at the temperatures required (e.g., 2200° F. to 2600° F.) to form the shaped porous ceramic filter article. Depending upon the composition of the moldable ceramic composition and the processing conditions, sintered ceramic refractory articles can be prepared having a broad range of porosity, surface area and the like.

A wide range of refractory foam compositions can be achieved using the basic procedures outlined above depending on the specific requirements of the final ceramic filter product. For example, if thermal shock resistance is of paramount importance, refractory compositions that result in low thermal expansion can be incorporated such as those containing lithium aluminosilicate, cordierite (a magnesium aluminosilicate) and/or aluminum titanate. In addition, if strength and toughness are more important, then such materials as mullite, zirconia-toughened ceramics and ceramic composites may be incorporated. If high thermal conductivity is important, then the use of silicon carbide or silicon nitride is recommended. If high refractoriness is important, pure alumina can be used. If long term durability is required in both thermal and mechanical shock conditions, then low expansion, strong and tough type systems will be utilized.

As noted earlier, the preferred embodiment of this invention is a porous ceramic filter element which, on its outlet surface, is provided with a thin porous ceramic membrane layer of predominant open-celled porosity which serves as a final filter and enhances the overall filtering capacity of the filter without significant increase in clean back pressure. The ceramic membrane layer is arranged to have pores which are smaller than those of the remaining portions of the filter element.

A wide variety of means can be used for providing this membrane on the porous, refractory aluminosilicate-based ceramic filter element according to the invention.

In one such method, the porous molded ceramic shape, after formation but prior to firing, is treated by applying to one or more surfaces or areas thereof which will, e.g., constitute filter outlet surfaces in the final fired ceramic filter, a ceramic paste or slurry containing a fugitive constituent capable of leaving a small pore when removed during the drying or firing operation. The fugitive constituent can be a sublimable compound or a burnable (e.g., carbonaceous) compound, utilized in a size and an amount which will result in pores having an average diameter smaller than that of the pores which will be present in the body portion or at untreated surfaces. During the firing operation, the ceramic paste or slurry becomes integrally associated with (fused to) the porous body portion.

In another method, surfaces of the mold corresponding to the areas on the part which will be, e.g., the outlet surface in the final fired ceramic filter, are treated by application thereto (generally onto the mold release agents already present) of a mixture of ceramic powder and fugitive constituent. The composition is then poured or injected into the mold and, after setting and removal from the mold, will have associated with it at the areas corresponding to the pre-treated mold surfaces, a thin skin of ceramic material which is rendered porous during the firing step. In this embodiment, it is also possible to eliminate use of fugitive constituents by choosing for the ceramic powder ingredients which are more refractory than those of the underlying body portion, such that during firing, the greater refractoriness of these grains prohibits sintering thereby leaving a partially-sintered, i.e., porous, membrane layer on the preselected areas of the body portion.

Among the preferred methods according to the invention involves the application of a ceramic paper (either woven, air-laid, or the like) atop the release agent on the appropriate mold surfaces prior to casting or injection-molding of the ceramic composition. In this manner, the composition, during foaming, expands into the ceramic paper, thereby laminating or bonding the systems together. On firing, there is developed a porous body portion having on one or more of its surfaces a thin porous ceramic membrane layer by reason of the now integrally-bonded ceramic paper whose pores are on the average smaller than those of the underlying body portion.

In the most preferred methods, formation of a porous ceramic membrane layer is accomplished integral with the formation of the underlying porous body. In situ processing in this manner offers significant advantage in the economics of manufacture of the final ceramic filter article.

According to one of these preferred methods, the release agent used in the mold, at the appropriate areas corresponding to where on the final ceramic filter the outlet surfaces will be, consists of or contains a defoaming surfactant (i.e., a foam suppressor). During the internal development of porosity in the molded composition by virtue of gas-generating reactions therein, the defoaming agent acts to sufficiently suppress the reaction to keep the pores at these surfaces controllably small, i.e., smaller than those within the body portion and at surfaces not in contact with the foam suppressor. Since the surfactant is per se a release agent or is associated with a release agent, no problems are encountered in demolding the part. Commonly used surfactants for the defoaming of detergents, paints, varnishes and the like are eminently suitable for this purpose.

According to another such preferred method, there is used, as the release agent per se or along with a release agent, a foam suppressing agent consisting of an organic compound having an unhindered hydroxyl group (i.e., an OH-"tail"), such as common alcohols, polyethylene glycol, polyvinyl alcohol, and the like. By provision of such agents on mold surfaces corresponding to those areas of the body portion where the porous ceramic membrane layer is desired, the hydroxyl group apparently absorbs the outgassing hydrogen molecules at these surfaces, thereby restricting their growth. A porous ceramic membrane is attained by virtue of the underlying foaming reaction and the fact that hydrogen gas bubbles at the desired surfaces are kept small.

In another method application to this aluminosilicate system, mold surfaces corresponding to those where a porous ceramic membrane is desired to be formed on the final ceramic filter product are provided with a gel accelerating agent, preferably along with a release agent, and most preferably along with a release agent consisting of or containing an OH-tail as above described. The gel accelerating agent serves to locally set the aluminosilicate hydrogel prior to reaction between the particulate metal and alkali compounds in the casting composition with the result of formation of a thin porous ceramic membrane layer having open pores which are smaller than those of the remaining portions of the filter.

Additional methods to achieve localized rapid gelation of the aluminosilicate system at surfaces where a porous ceramic membrane is desired include incorporation of water along with the release agent at the desired mold surfaces, the water being in an amount such that the combined, but not yet set, silicate and aluminate mixture absorbs a sufficient portion of this water to locally dilute the original amounts of soluble silicate and soluble aluminate, thereby locally reducing the gel time at these surfaces as compared to that occurring throughout the remainder of the composition. In another method, it can be arranged that water is locally removed from surfaces where a porous ceramic membrane is desired so as to bring about more rapid gelation of the aluminosilicate system at those areas (by virtue of increased solids concentration). This can be achieved, for example, by treating the corresponding mold surfaces with a hydroscopic release agent (or a release agent composition containing a hydroscopic agent) or by arranging a layer of dry paper at the required mold surface or by localized heating of the required mold surface.

Another method applicable to the aluminosilicate hydrogel system is to bring about a change in pH on the surface where the porous ceramic membrane is required. For example, incorporation of an acidic component in the release agent such as acetic acid or dilute hydrochloric acid will locally accelerate the gelation prior to the onset of foaming.

To further describe the present invention, a number of examples are presented in the following section illustrating a variety of potential compositions, processing techniques and the like. In accumulating the data set forth in the examples, density, three-point modulus of rupture (MOR) and the coefficient of thermal expansion were measured by standard ASTM techniques. The pore structure (number of complete pore cells per linear inch) was measured using both Scanning Electron Microscope (SEM) and stereographic light microscope photographs. The predominant microstructural phases were determined using X-ray diffraction techniques as well as light microscope observation of polished and etched surfaces. The relative permeability was obtained using a turbine type air blower and recording the back pressure associated with the open celled structure as 100 scfm (standard cubic feet per minute) of air was forced through. Thermal shock resistance was interpreted as the percent of initial MOR strength the ceramic foam retained after exposing the material to 100 thermal cycles between room temperature and 1250° F.

EXAMPLE 1

A particularly effective ceramic foam filter for high temperature filtering applications was prepared using fused cordierite and calcind kyanite (mullite) refractories in the following manner. Initially, two slurries were prepared, one containing sodium silicate and the other, sodium aluminate. The slurries were prepared to a specific gravity of 2.1 g/cc at a viscosity of 25,000 cps at 70° F.

| Sodium Silicate Slurry | |
| --- | --- |
| sodium silicate grade 50 (44.1% solids) | 27.2% |
| additional process water | 5.4% |
| Dow surfactant DC 190 (tradename) | 0.6% |
| silica fume (¼ micron) | 1.6% |
| chopped fibers (⅛ and down) | 2.0% |
| fused cordierite (−200 mesh) | 30.2% |
| calcine kyanite (−200 mesh) | 32.7% |
| powdered aluminum metal (6-9 micron) | 0.3% |

| Sodium Aluminate Slurry | |
| --- | --- |
| sodium meta-aluminate solution (46% solids) | 25.9% |
| additional water | 5.7% |
| Dow surfactant DC 190 (tradename) | 0.6% |
| silica fume (¼ micron) | 1.5% |
| chopped fibers (⅛ and down) | 1.9% |
| fused cordierite (−200 mesh) | 33.9% |
| calcined kyanite (−200 mesh) | 31.0% |

Using a high shear type mixer or blender apparatus, equal weights (360 g) of the above slurries were combined and cast into a mold cavity with an 840 cc capacity. Since the slurries had a specific gravity of 2.1 g/cc, only 41% of the mold cavity was filled. In approximately 30 seconds after the two slurries were combined at 70° F., the mix began to foam with a predominantly open-celled structure thereby filling the mold to yield a 0.86 g/cc wet density. Foaming stopped when the sodium aluminosilicate hydrogel binder phase "set" (approximately 3-4 minutes), freezing the expanded structure in place. The hydrogel bond developed sufficient strength in 8-10 minutes to allow the cast part to be demolded.

At this point the part contained 4.6% sodium oxide and 20.1% water at the above mentioned 0.86 g/cc density. In order to increase the refractoriness, the sodium oxide was then removed. This was accomplished by rinsing the part, in this case a 10 inch diameter plate, ⅜ inches thick, with 10 liters of purified water (preferably deionized water with a 50,000 ohm resistance or better). This rinse reduced the sodium oxide content to approximately 2%, the stoichiometric amount. To remove the remaining sodium, the part was then subjected to 30-40 liters of a 1% ammonium chloride solution whereby substantially all of the $NH_4^+$ ions replaced the $Na^+$ ions. An additional 5 liter water rinse was then performed to remove excess $Cl^-$ ions after which the part was removed and allowed to drain and dry.

After the initial draining and air drying period, the part was heated in a vented oven to 400°-600° F. to further dehydrate and remove some of the ammonium present. The length of time the part is in the oven varies with the particular type of oven (conventional or microwave) and the specific amount of water and ammonium in the part as well as the part's porosity. In this particular example, the 10 inch plate was heated to 600° F. in 6 hours. The warm part was removed from the oven and placed directly in a kiln supported on suitable kiln furniture. The part was then slowly heated to the required firing temperature of 2425° F. in 10–12 hours. Once at temperature, the part was held for 2 hours to complete the sintering operation before being allowed to furnace cool.

Using the above formulation and process, the 10 inch ceramic foamed plate was characterized as follows:

| | |
|---|---|
| Density | 0.63 g/cc |
| Sodium content | less than 0.5% |
| Permeability (in a ten-inch plate) | 4 inches of water back-pressure at 100 scfm |
| Predominant microstructure | cordierite, mullite |
| Coefficient of expansion | $1.5 \times 10(-6)$ to 700° C. $3.2 \times 10(-6)$ to 1000° C. |
| Modulus of rupture | 400–450 psi |
| Modulus of rupture after 100 cycles from RT to 1250° F. | 380–410 psi |
| Pore structure | 30 pores per linear inch |
| Apparent refractoriness | 2500° F. |

A series of 10 inch reticulated foamed plates produced in this manner were placed in the exhaust stream from a 1982, 6.2 liter diesel engine to determine their effectiveness in filtering diesel particulates produced. The plates were arranged in a "stacked element" design. While the exact collection efficiency was not determined, a considerable amount of particulates were trapped within the cross-sectional area of the plates. Once filled with particulates, the plates were regenerated by placing them in a furnace and heating to the soot ignition temperature of 960° F. at which time the plate increased in temperature over that of the surrounding furnace environment indicating an exothermic reaction or burning of the particulates was taking place.

After regeneration, the plates were subjected to the same air flow permeability test to determine how much of the particulates or soot had been removed. Since the same 4 inches of water backpressure was reached, it was assumed that all particulates were burned.

The plates were put back in the exhaust stream to collect more particulates, but this time regeneration was performed using a diesel fuel burner/blower arrangement that was able to heat the ceramic plates in 3–4 minutes to 1400° F. thereby setting up a more thermal shock prone regeneration cycle that was more in tune with the expected service environment. Again, the regenerated plates experienced the same backpressure resistance as new plates. After a number of such regeneration cycles were performed, the plates were sectioned into MOR test bars and broken to determine if any loss in strength occurred as the result of such thermal cycling. No significant loss in strength was recorded.

EXAMPLE 2

An essentially all cordierite type ceramic foam was produced in a similar manner to that in Example 1 is with fused cordierite aggregate being the primary aggregate in each of the two reactive slurries, i.e., silicate and aluminate slurries, as follows:

| Silicate Slurry | |
|---|---|
| sodium silicate grade 50 | 27.1 |
| additioal water | 6.0 |
| Dow DC 190 (tradename) surfactant | 0.6 |
| silica fume | 3.6 |
| fused cordierite (−200 mesh) | 60.8 |
| powdered aluminum metal (6–9 microns) | 0.1 |
| chopped fibers | 1.8 |

| Aluminate Slurry | |
|---|---|
| sodium meta aluminate solution | 24.7 |
| additional water | 6.9 |
| Dow DC 190 (tradename) surfactant | 0.6 |
| silica fume | 3.2 |
| fused cordierite (−200 mesh) | 62.8 |
| chopped fibers | 1.8 |

The above slurries were blended together as in Example 1 with the same volume expansion due to the foaming action of the aluminum metal and sodium hydroxide portion of the binder. Rinsing, ion-exchange and drying were also performed as they were in Example 1. Firing however, was slightly lower with an upper holding temperature of 2000° F.

The above formulation and procedures resulted in a ceramic foam with the following properties and characteristics:

| | |
|---|---|
| Density | 0.8 g/cc |
| Pores per linear inch | ~30 |
| Coefficient of thermal expansion | $1.8 \times 10^{-6}$ in/in °C. |
| MOR | 827 psi |
| MOR after 100 thermal cycles (to 1250° F.) | 777 psi |
| Permeability (backpressure at 100 scfm) | 40 inches $H_2O$ |
| Principal microstructural constituent | Cordierite |

EXAMPLE 3

The same mix and procedures of Example 2 above were prepared with the exception that the final firing temperature was reduced to 1800° F. The purpose in firing to a lower temperature was to increase the permeability (lowering the backpressure at the 100 scfm flow rate) of the final foamed ceramic. Using the lower firing temperature resulted in the following properties and characteristics:

| | |
|---|---|
| Density | .74 g/cc |
| Pores per linear inch | ~30 |
| Coefficient of thermal expansion | $1.8 \times 10^{-6}$ in/in °C. |
| MOR | 505 psi |
| MOR after 100 thermal cycles (at 1250° F.) | 469 psi |
| Permeability (backpressure at 100 scfm) | 18 inches of water |
| Principal microstructural constituent | Cordierite |

EXAMPLE 4

An essentially all calcined kyanite mix was also produced in a similar manner of mixing, leaching/rinsing, ion exchange and drying as that set forth in the above examples using the following slurry formulations:

| Silicate Slurry | |
|---|---|
| sodium silicate grade 50 | 26.0 |
| additional water | 5.8 |
| Dow DC 190 (tradename) surfactant | 0.6 |
| silica fume | 3.3 |
| calcined kyanite (−200 mesh) | 62.5 |
| powdered aluminum metal (6-9 microns) | 0.1 |
| chopped fibers | 1.7 |

| Aluminate Slurry | |
|---|---|
| sodium meta aluminate solution | 23.7 |
| additional water | 6.6 |
| Dow DC 190 (tradename) surfactant | 0.6 |
| silica fume | 3.0 |
| calcined kyanite (−200 mesh) | 64.5 |
| chopped fibers | 1.6 |

Once properly dried, the calcined kyanite foamed plates were fired at 2600° F. with the following properties and characteristics obtained:

| Density | 0.7 g/cc |
|---|---|
| Pores per linear inch | ∼30 |
| Coefficient of thermal expansion | $4 \times 10^{-6}$ in/in °C. |
| MOR | 451 |
| MOR after 100 thermal cycles (to 1250° F.) | Failed after 6 cycles |
| Permeability (backpressure at 100 scfm) | 12 inches of water |
| Principal microstructral constituent | Mullite |

EXAMPLE 5

A ceramic foam composition containing dispersed zirconium oxide as a toughening aid was also prepared using the sodium aluminosilicate hydrogel system and a fused zirconia-mullite aggregate using the following starting slurry formulations:

| Silicate Slurry | |
|---|---|
| sodium silicate grade 50 | 21.9 |
| additional water | 4.9 |
| Dow DC 190 (tradename) surfactant | 0.5 |
| silica fume | 2.8 |
| fused zirconia-mullite (−200 mesh) | 68.4 |
| powdered aluminum metal (6-9 microns) | 0.1 |
| chopped fibers | 1.4 |

| Aluminate Slurry | |
|---|---|
| sodium meta aluminate solution | 19.9 |
| additional water | 5.5 |
| Dow DC 190 (tradename) surfactant | 0.5 |
| silica fume | 2.5 |
| fused zirconia-mullite kyanite (−200 mesh) | 70.2 |
| chopped fibers | 1.4 |

Once properly dried, the foamed plates were fired at 2600° F. with the following properties and characteristics obtained:

| Density | .84 g/cc |
|---|---|
| Pores per linear inch | ∼30 |
| Coefficient of thermal expansion | $5 \times 10^{-6}$ in/in °C. |
| MOR | 476 psi |
| MOR after 100 thermal cycles (to 1250° F.) | 395 psi |
| Permeability (backpressure at 100 scfm) | 25 inches of water |
| Principal microstructural constituent | mullite/zirconia |

EXAMPLE 6

Another useful ceramic foamed system based on a cordierite-silicon carbide blend was also prepared using the sodium aluminosilicate hydrogel system and the same leaching/rinsing, ion exchange and drying procedures set forth in the above examples. The silicate and aluminate slurries used for this example consisted of the following materials:

| Silicate Slurry | |
|---|---|
| sodium silicate to grade 50 | 27.4 |
| additional water | 6.2 |
| Dow DC 190 (trademark) surfactant | .5 |
| silica fume | 2.8 |
| fused cordierite (−200 mesh) | 34.0 |
| silicon carbide (−200 mesh) | 27.4 |
| powdered aluminum metal (6-9 microns) | 0.1 |
| chopped fibers | 1.6 |

| Aluminate Slurry | |
|---|---|
| sodium meta aluminate solution | 23.6 |
| additional water | 6.8 |
| Dow DC 190 (trademark) surfactant | 0.5 |
| silica fume | 2.4 |
| fused cordierite (−200 mesh) | 65.1 |
| chopped fibers | 1.5 |

Once properly dried, the foamed plates were fired at 2200° F. with the following properties and characteristics obtained:

| Density | .75 g/cc |
|---|---|
| Pores per linear inch | ∼30 |
| Coefficient of thermal expansion | $2.5 \times 10^{-6}$ in/in °C. |
| MOR | 380 psi |
| MOR after 100 thermal cycles (to 1250° F.) | 335 psi |
| Permeability (backpressure at 100 scfm) | 22 inches of water |
| Principal microstructural constituent | Cordierite, SiC |

EXAMPLE 7

A particularly effective ceramic foam filter for the high temperature filtering of diesel particulates includes the casting of a sodium aluminosilicate hydrogel bonded system containing powdered aluminum metal to create a reticulated porous plate in which one side of the mold surface was coated with a release agent based on polyethylene glycol 3350, polyvinyl alcohol, glycerine and water of the following composition:

| polyethylene glycol 3350 | 17.5% |
|---|---|
| polyvinyl alcohol solution | 12.5% |
| glycerine | 36.5% |

| | |
|---|---|
| -continued | |
| water | 33.5% |

Once the silicate and aluminate containing slurries were combined and cast into the mold, the mix adjacent to the above release agent rapidly gelled, thereby preventing the growth of any hydrogen gas bubble that may have formed near the mold surface as the result of the reaction of the aluminum metal powder and the sodium hydroxide in the mix. After demolding, the cast part displayed an excellent "skin" or smooth membrane surface that upon further processing to remove sodium and water followed by firing at a suitable temperature to form ceramic bonds, remained porous even though by naked eye the surface appears dense.

A series of 10 inch foamed plates produced in this manner with such excellent ceramic membrane surfaces on one side were fashioned into a stacked element filtering arrangement. The efficiency of the diesel particulate collection was measured using a suitable device at a major diesel engine manufacturer's test facility and found to be in the 65-70% efficient range. Such efficiencies would make the 1991 and 1994 diesel engine prototypes now being designed meet the EPA emission standards.

EXAMPLE 8

Another particularly effective mold release that works in the sodium aluminosilicate hydrogel system to create a porous membrane surface again uses water as the gel accelerating ingredient and simply glycerine for its release effects as follows:

| | |
|---|---|
| glycerine | 50% |
| water | 50% |

Again, after the silicate and aluminate containing slurries were combined and cast into the mold with the above release agent, a rapid gelation occurred against this surface creating a smooth skin free of large gas bubbles since the surfaces in question had already set prior to foaming.

EXAMPLE 9

In a similar manner, the same mold is coated on one surface with a thin layer of woven mullite fibered paper. The sodium aluminosilicate hydrogel system is cast and allowed to foam in the normal manner. After demolding, the woven paper will be significantly attached to the ceramic foam so that no separation occurs during the subsequent processing to remove sodium and water prior to firing. The resultant laminated structure will exhibit excellent thermal shock and filtering efficiency.

EXAMPLE 10

A silicone release agent modified with a silicone defoaming surfactant was sprayed on one side of a metal mold that was heated to 140°-150° F. The other side of the mold remained at room temperature. A sodium aluminosilicate hydrogel bonded foaming mix such as that disclosed in Example 1 was then cast into the mold. Due to the accelerated set time of the gel adjacent to the heated surface, insufficient time was available for the foam cells to grow to any appreciable size. The further away from the hot surface, the larger the cell walls were able to grow prior to gelation. Even though the surface adjacent to the heated surface appeared smooth and dense to the naked eye, once the foam was rinsed in deionized water and subjected to ionic exchange to remove the sodium from the hydrogel structure as disclosed herein, this same surface is actually quite porous and provides an excellent ceramic membrane effect.

Having described the invention with reference to particular compositions, processes, examples and embodiments, it is to be understood that these particulars are presented for purposes of illustration and description, and are not otherwise intended as strict limitations upon the scope of the fundamental invention as defined in the appended claims.

What is claimed is:

1. A process for producing a porous refractory ceramic filter for use in the filtering of particulates from diesel exhaust gases, said filter having an inlet surface for receipt of diesel exhaust gases and an outlet surface for discharge of diesel exhaust gases which have traversed through said filter, comprising the steps of:
   (a) providing a foamable ceramic composition comprised of an aqueous admixture of (1) an alkali metal silicate and an alkali metal aluminate, each in an amount effective to form therebetween an aluminosilicate hydrogel which binds all components of said composition, after foaming, into a self-supporting body in the desired shape of said filter; (2) refractory ceramic materials; (3) metal powder in an amount effective to react with alkali metal in said composition and generate as a product hydrogen gas in an amount effective to bring about foaming and expansion of said foamable ceramic composition; (4) a surfactant in an amount effective to form from said hydrogen gas small bubbles which provide a predominantly open-celled porosity in the foamed and expanded foamable ceramic composition, and (5) a gel strengthening and viscosity-modifying magnet in an amount effective to reduce the viscosity of said foamable ceramic composition as compared to the same composition without said gel-strengthening and viscosity-modifying agent;
   (b) introducing a quantity of said foamable ceramic composition into a shape-defining area for a time sufficient to permit reaction among the components of said composition to produce a foamed, porous aluminosilicate hydrogel-bound, self-supporting ceramic precursor of predominantly open-celled porosity in the shape of said shape-defining area;
   (c) removing said self-supporting precursor from said shape-defining area;
   (d) contacting said self-supporting precursor with water for a time effective to remove therefrom leachable alkali metal compounds;
   (e) thereafter contacting said self-supporting precursor with a dilute solution of non-alkali metal inorganic salt to effect substantially complete exchange of the ion of said non-alkali metal inorganic salt for the alkali metal ion of remaining alkali metal compounds in said self-supporting precursor; and
   (f) thereafter firing said self-supporting precursor to form ceramic bonds therein and produce said porous refractory ceramic filter having a predominantly open-celled porosity.

2. The process according to claim 1 further comprising providing on said outlet surface of said porous refractory ceramic filter a thin, integral, porous ceramic membrane layer of open-celled porosity, the pores of which have an average diameter less than that of the pores within and at said inlet and other surface of said porous refractory ceramic filter.

3. The process according to claim 1 wherein said alkali metal silicate and said alkali metal aluminate are a sodium silicate and a sodium aluminate.

4. The process according to claim 3 wherein said gel strengthening and viscosity-modifying agent is silica fume.

5. The process according to claim 4 wherein said metal powder is powdered aluminum.

* * * * *